United States Patent [19]

Gunderson et al.

[11] Patent Number: 5,577,430
[45] Date of Patent: Nov. 26, 1996

[54] ADJUSTABLE FOOD PRODUCT SLICER

[76] Inventors: Glenn K. Gunderson, 950 Westfield La., Neenah, Wis. 54956; William K. Gunderson, 1221 Van Dyke Rd.; Unit 1-I, Appleton, Wis. 54915

[21] Appl. No.: 287,627

[22] Filed: Aug. 8, 1994

[51] Int. Cl.⁶ .................................................. B26D 3/30
[52] U.S. Cl. ................. 83/870; 83/762; 83/454
[58] Field of Search .................. 83/762, 468.7, 83/468.9, 468.6, 454, 870, 932; 269/291, 303, 295, 315

[56] References Cited

U.S. PATENT DOCUMENTS

| | | | |
|---|---|---|---|
| 662,756 | 11/1900 | Bingham | 83/762 |
| 665,066 | 1/1901 | Cooley | 83/762 |
| 1,328,301 | 1/1920 | Serrell | 83/762 |
| 1,441,887 | 1/1923 | Scott | 83/762 |
| 1,554,638 | 9/1925 | McLeod . | |
| 1,589,030 | 6/1926 | Whiting | 83/762 |
| 1,725,781 | 8/1929 | Corby | 83/762 X |
| 1,771,434 | 7/1930 | Crawford . | |
| 2,474,171 | 6/1949 | Swanson | 83/762 |
| 2,679,274 | 5/1954 | Criner | 83/762 |
| 3,971,273 | 7/1976 | Peters et al. | 83/762 |
| 4,125,046 | 11/1978 | Kroh et al. | 83/762 |
| 4,249,445 | 2/1981 | Browning | 83/762 |
| 4,399,989 | 8/1983 | Baillie | 83/762 X |
| 4,589,206 | 5/1986 | Marcoux | 83/762 X |

*Primary Examiner*—Rinaldi I. Rada
*Attorney, Agent, or Firm*—Andrus, Sceales, Starke & Sawall

[57] ABSTRACT

A device is provided for facilitating the cutting of an object, such as a food product, into slices. The device includes an indexing assembly having a rotatable indexing disc which may be moved to various positions corresponding to the desired thickness of the slice and having an indexing pin which, when seated in a predetermined notch, prevents rotation of the indexing disc against which the food product is abutted and maintains the indexing disc in position when slicing the food product.

19 Claims, 2 Drawing Sheets

ADJUSTABLE FOOD PRODUCT SLICER

BACKGROUND OF THE INVENTION

This invention relates to device for facilitating the cutting of food products into slices, and in particular, to an indexing assembly which allows the user to select a predetermined thickness for each slice.

It is often desirable to slice food products, such as homemade and uncut bakery, into consistent, even slices with the use of a knife alone, As such, cutting aids have been developed to facilitate the slicing of such food products.

Heretofore, a prior bread cutting aid has included a bakery board upon which the bread is set. A pair of opposing knife guides extend from opposite sides of the bread board. Each knife guide includes an elongated slot in axial alignment with the slot in the opposite knife guide. A knife extends through the slots which guide the knife when cutting the bakery.

The thickness of the slice is controlled by an indexing assembly. The assembly includes a rotatable indexing disc and a knob to facilitate rotation of the disc so as to abut the disc, and a portion of the bakery extends inbetween the slots in the knife guides. By rotating the knob, the disc rotates and simultaneously moves in a longitudinal direction along the surface of the bakery board such that the end of the bakery is urged along the surface of the bakery board toward the slots in the knife guide. In this manner, by rotating the indexing disc and positioning the indexing disc at a predetermined location along the surface of the bakery board, the thickness of the slice of bakery to cut by the knife is selected.

When turned to the proper preselected position, the indexing disc of the indexing assembly must be maintained in that position along the surface of the bakery board in order to insure a straight and an accurate slice of bakery. In addition, further rotation of the indexing disc must be prevented in order to prevent further longitudinal movement of the indexing disc. This, in turn, insures consistency in the thickness of each slice of bakery. Therefore, it is desirable to provide an adjustable bakery slicer, having an indexing assembly which simultaneously prevents rotational and axial movement of the indexing disc upon selection of a predetermined thickness for the slice of bakery.

Therefore, it is a primary object and feature of the present invention to provide an adjustable food product slicer having an indexing assembly which simultaneously prevents rotational and axial movement of the indexing disc upon selection of a predetermined thickness for a slice of food product, such as bakery.

It is an additional object and feature of the present invention to provide an adjustable food product slicer which is simple to operate and inexpensive to manufacture.

An adjustable food product slicer is provided to facilitate the cutting of a food product into slices. The slicer includes a board extending along a longitudinal axis. The board includes a pair of sides interconnected by a support surface. A pair of opposing knife guides extend from distinct sides of the board. Each knife guide includes an elongated slot which lies in a plane which is generally perpendicular to the support surface of the board. A support interconnects the pair of knife guides.

An indexing disc is also provided. The indexing disc is rotatable about and movable along a second longitudinal axis, parallel to and spaced from the longitudinal axis along which the board extends. The indexing disc includes a rearward surface orientated toward the support and a forward surface for engaging the food product to be sliced.

An indexing ramp is secured to the support. The indexing ramp includes a sloped surface which extends away from the support and toward the rearward surface of the indexing disc. Notches are provided in the sloped surface for receipt of an indexing pin which extends from the rearward surface of the indexing disc toward the support. Means are provided for biasing the indexing disc towards the support.

In operation, the indexing disc is rotated such that the indexing pin aligns with a distinct notch on the sloped surface of the indexing ramp. The pin is urged into the notch which, in turn, prevents rotation of the indexing disc about the second longitudinal axis and prevents axial movement along the second longitudinal axis. Each notch corresponds to a predetermined axial distance between the forward face of the indexing disc and the plane in which the slots lie. By seating the indexing pin in a different notch, the distance between the forward face of the indexing disc and the knife slots is changed. This, in turn, allows the user to preselect the thickness of the slice.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENT

Figure 1:
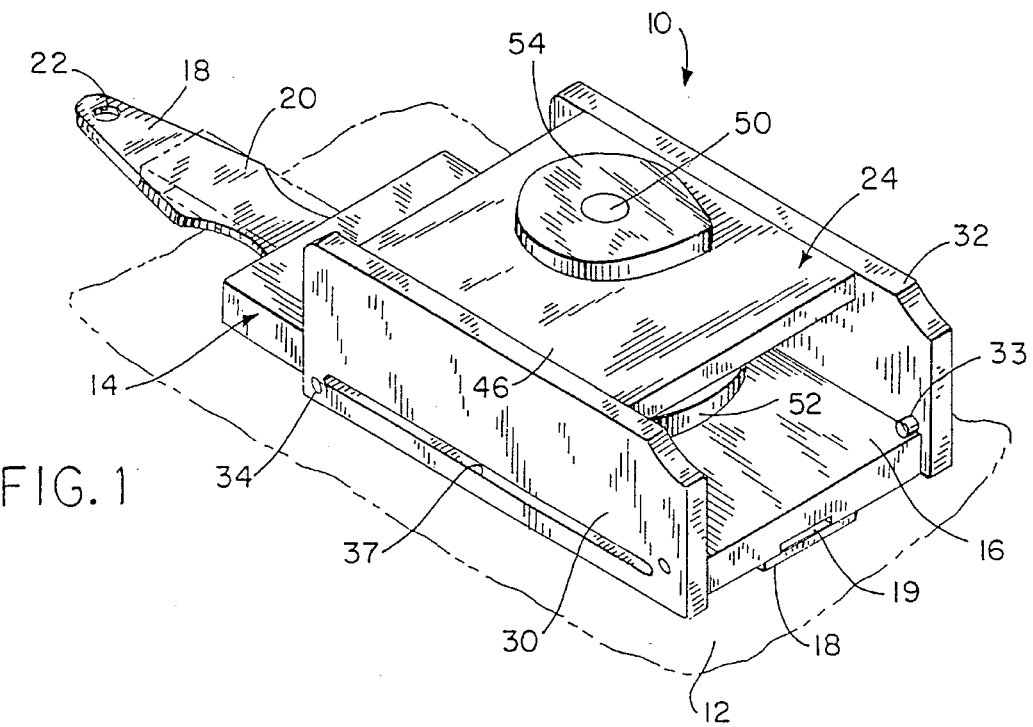
FIG. 1 is an isometric view of the adjustable food product slicer of the present invention in a storage condition.

The adjustable food product slicer of the present invention is generally designated by the reference numeral 10. The slicer 10 is designed for use on a flat surface such as table top 12 or the like.

The adjustable slicer 10 includes a base board 14 which extends along a longitudinal axis. The base board 14 has an upper support surface 16 and a lower surface (not pictured). A handle 18 is secured to the lower surface of base board 14 over a slot 19, which is adapted to house the blade of a knife when not in use. The handle 18 includes a head portion 20 to facilitate the carrying of the adjustable slicer by the user. An aperture 22 extends through the head portion 20 of the handle 18 so as to allow the adjustable slicer to be hung on a nail or a hook in a kitchen wall.

The adjustable slicer 10 includes an indexing assembly 24 which is pivotally mounted to opposite sides 6, 28 of base board 14. This, in turn, allows the indexing assembly 24 to be pivoted between a first storage condition shown in FIG. 1, and a second, operating condition shown in FIG. 2.

Figure 2:
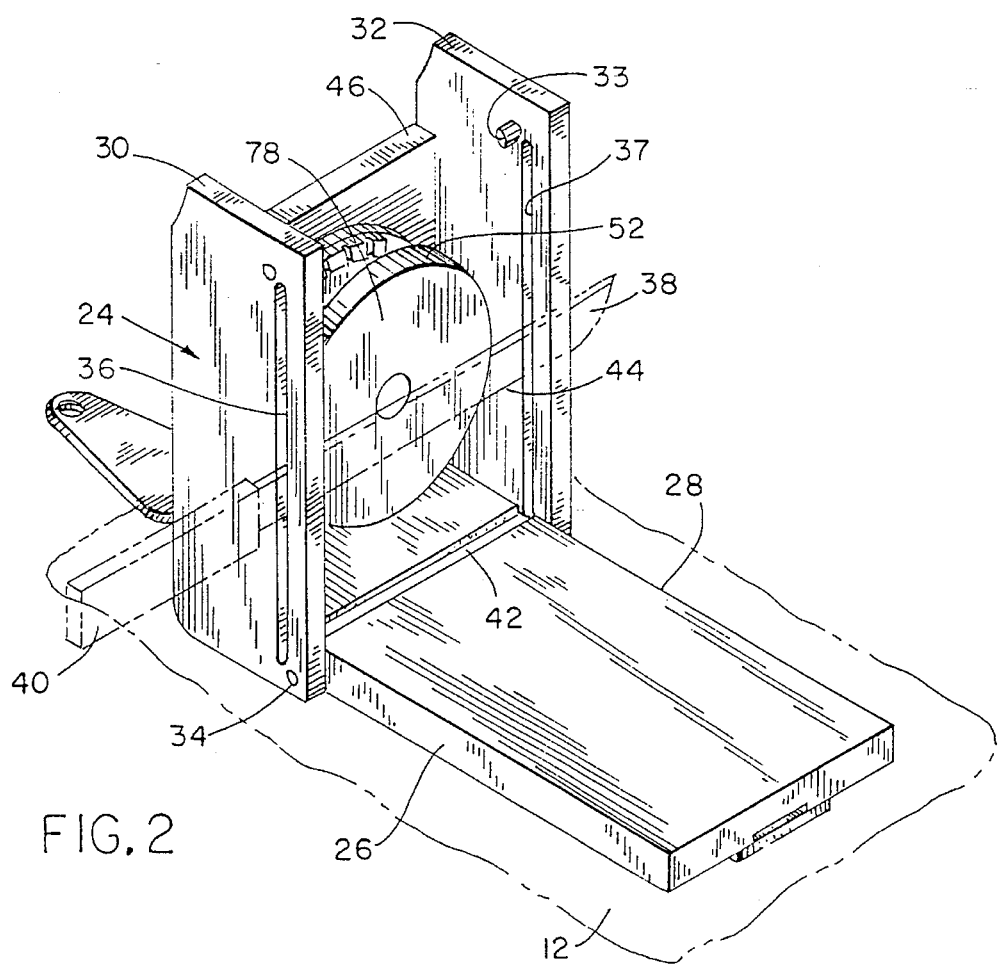
FIG. 2 is an isometric view of the adjustable slicer of FIG. 1 in an operating condition.

Referring to FIG. 2, indexing assembly 24 includes a pair of opposing knife guides 30, 32, each of which are pivotally mounted to base board 14 by pins 34. Each pin 34 extends through a distinct one of knife guides 30, 32 and into a distinct side 26, 28, respectively, of base board 14. A tab member 33 extends from each knife guide 30, 32 toward the opposing knife guide, 2, 30, respectively. Tab members 33 engage the upper surface of base board 14 to maintain indexing assembly 24 in its storage condition.

Each knife guide 30, 32 includes an elongated slot 36, 37, respectively. Slot 36 in the knife guide 30 is in alignment with the opposing slot 37 such that a blade 38 of a knife 40 may be extended through both of the slots 36, 37. When the indexing assembly 24 is in the operating condition, FIG. 2, each slot 36, 37 is perpendicular to base board 14 and extends below the upper bakery support surface 16.

A groove 42 extends across the upper support surface 16 of base board 14 and is perpendicular to and lies in the same plane as slots 36, 37. Groove 42 allows the edge 44 of blade 38 to proceed in slots 36, 37 past the upper support surface 16 of board 14 to facilitate the cutting of the bakery, as hereinafter described.

Figure 3:
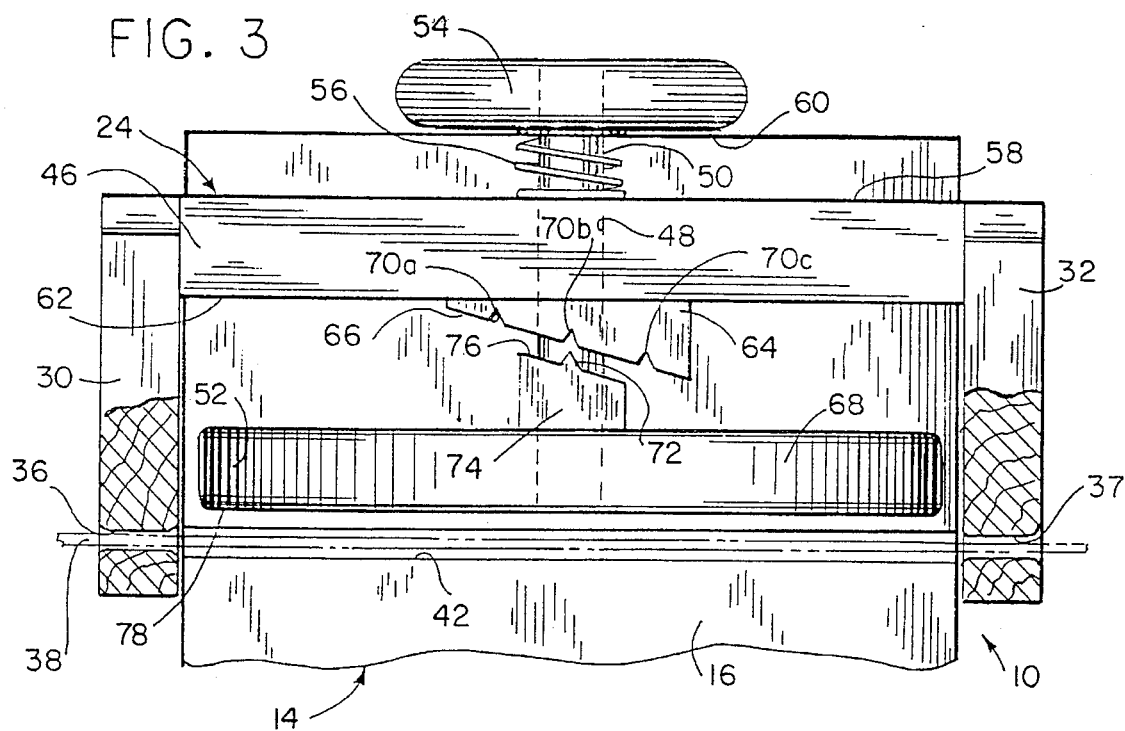
FIG. 3 is a top plan view of a portion of the adjustable slicer of FIG. 2 with portions broken away.

A support 46 interconnects knife guides 30 and 32. As best seen on FIG. 3, support 46 includes an aperture 48 through which an elongated axle 50 extends. Aperture 48 is dimensioned so as to allow rotation of axle 50 therein. Axle 50 interconnects an indexing disc 2 to a knob 54 in order to translate rotation of the knob 54 to indexing disc 52.

A spring 56 is positioned about axle 50 between rear surface 58 of support 46 and forward surface 60 of knob 54. Spring 56 urges knob 54 away from rearward surface 58 of support 46 and, in turn, urges indexing disc 52 toward the forward surface 62 of support 46.

Figure 4:
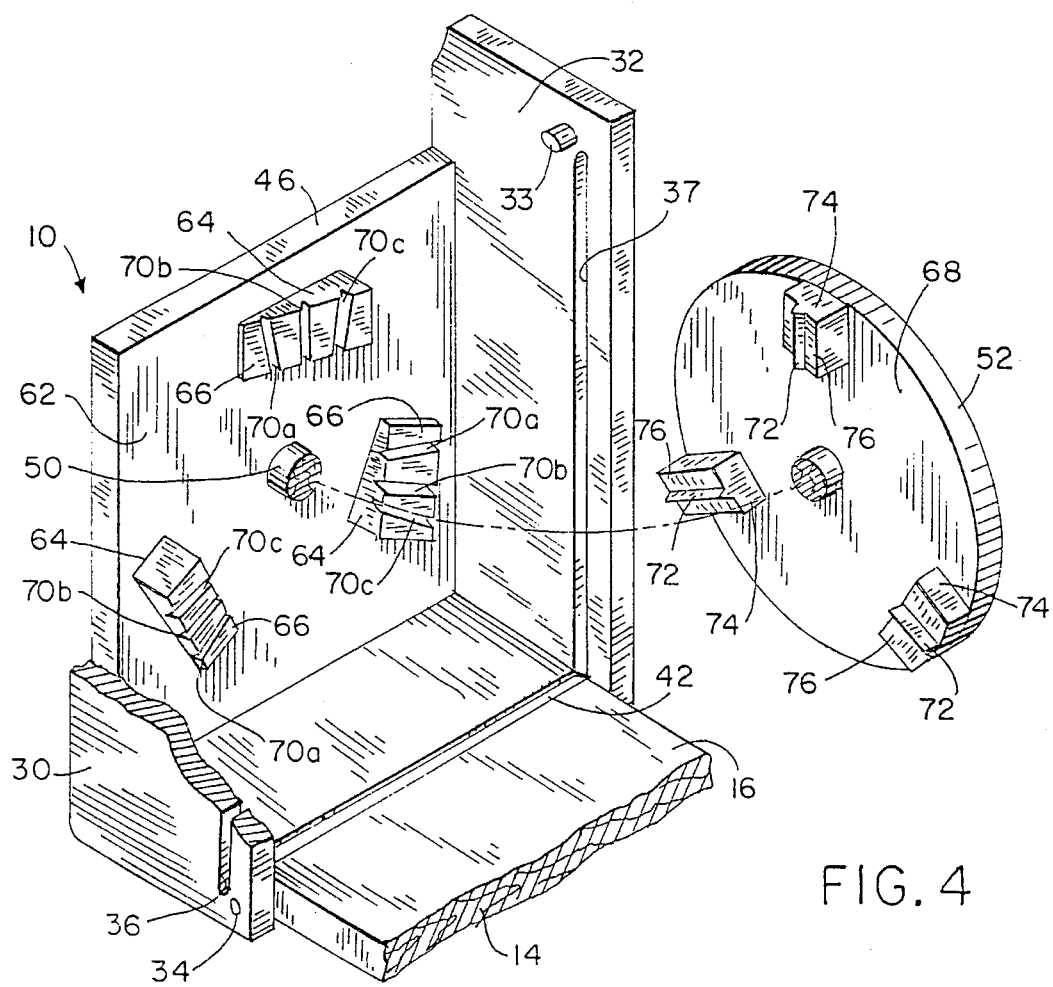
FIG. 4 is an exploded, isometric view of the adjustable slicer of FIG. 2 with portions broken away.

A plurality of indexing ramps 64, FIG. 4, extend from the forward surface 62 of support 46. The indexing ramps 64 are equally radially spaced, and are located on a common radius from aperture 48. Each indexing ramp 64 includes an outer sloped surface 66 which slopes away from the forward surface 62 of support 46 toward the rearward surface 68 of indexing disc 52. Sloped surface 66 includes a plurality of notches 70a, 70b, 70c which are dimensioned for receipt of an indexing pin 72.

Indexing pin 72 extends from each of a plurality of indexing pin members 74 which project from the rearward surface 68 of indexing disc 52. The indexing pin members 74 have a radial spacing equal to that of indexing ramps 64, and are located on the same radius as indexing ramps 64 from aperture 48. Each indexing pin member 74 includes a sloped surface 76 which is complementary to sloped surface 66 of indexing ramp 64.

In operation, knob 54 is urged by the user toward support 46 such that the forward surface 60 of knob 54 approaches rearward surface 58 of support 46. This, in turn, causes indexing pin 72 to disengage the notch in which indexing pin 72 is seated and allows knob 54 to be rotated.

When knob 54 is rotated, axle 50 translates the rotation to indexing disc 52 and hence, each indexing pin 72 may be aligned with another notch in the sloped surface 66 of each indexing ramp 64. When each indexing pin 72 is in alignment with the desired notch in sloped surface 66 of each indexing ramp 64, knob 54 is released and spring 56 urges the rearward surface 68 of indexing disc 52 toward the forward surface 62 of support 46 such that each indexing pin 72 meshes into a preselected notch 70a, 70b or 70c in each indexing ramp 64 and sloped surface 76 of each indexing pin member 74 engages complimentary sloped surface 66 of each indexing ramp 64.

The angled walls of notches 70a–70c have a taper corresponding to that of indexing pins 72, to assist in guiding each pin 72 into the desired one of notches 70a–70c in the event of slight misalignment therebetween when knob 54 is released.

Each notch, 70a, 70b or 70c, into which indexing pin 72 may be seated corresponds to a predetermined axial distance between the forward surface 78 of indexing disc 52 and the plane in which slots 36, 37 and groove 42 lie. This distance, in turn, corresponds to the thickness of the slice of the food product. In addition, the pins 72 seated in one of notches 70a, 70b, 70c prevents rotational movement of indexing disc 52 and further longitudinal movement of indexing disc toward or away from support 46.

In order to slice the food product such as bakery, an end of the food product is positioned so as to abut surface 78 of indexing disc 52. The blade 38 of knife 40 is extended through each slot 36, 37 in knife guides 30, 32, respectively. As knife blade 38 is drawn toward groove 42 in support surface 16 of base board 14, edge 44 of blade 38 engages and slices the food product at the predetermined thickness corresponding to the axial distance between the forward surface 78 of indexing disc 52, and the plane in which slots 36, 37 and groove 42 lie. Edge 44 of blade 38 may be extended into groove 42 in support surface 16 of base board 14 so as to allow knife 40 to slice completely through the food product.

As previously described, indexing assembly 24 is pivotable between a closed condition, FIG. 1, and an operating condition, FIG. 2. Tab members 33 insure that the forward surface 78 of indexing disc 52 does not engage base board 14. This, in turn, prevents damage to indexing disc 52 and insures a consistent, accurate slice.

While the invention has been described in connection with slicing of food products such as bread or other bakery, it is understood that the invention could be used in any application in which it is desired to adjust the thickness of a slice.

In addition, it is contemplated that certain components of the invention, such as indexing disc 52 and pin members 74, and/or support 46 and indexing ramps 64, are well suited for one-piece construction of a thermoplastic material in an injection molding operation.

Various embodiments of carrying out the invention are contemplated as being within the scope of the following claims particularly pointing out and distinctly claiming the subject matter regarded as the invention.

We claim:

1. An indexing assembly for positioning an object on a base board and for facilitating the cutting of the object into slices, comprising:

an indexing disc having a rearward surface, the indexing disc operatively connected to the base board, and rotatable about and movable along a longitudinal axis so as to position the object to be sliced on the base board in order to select a thickness for each slice;

means for rotating the indexing disc to adjust the position of the disc along the longitudinal axis; and means for engaging the indexing disc to selectively prevent rotation of the indexing disc and to simultaneously selectively prevent movement of the indexing disc along the longitudinal axis so as to selectively fix the position at the indexing disc along the longitudinal axis, the means for engaging the indexing disc including:

a support extending from the base board;

one or more indexing ramps secured to the support, the indexing ramp having a sloped surface which extends away from the support and toward the rearward surface of the indexing disc, the sloped surface including a plurality of indexing notches therein;

means for biasing the indexing disc toward the support; and an indexing pin member extending from the rearward surface of the indexed disc toward the support, the indexing pin member including an indexing pin which may be seated within a distinct, preselected notch in the sloped surface of the indexing ramp.

2. The indexing assembly of claim 1 wherein the indexing pin member includes a sloped surface which extends away from the rearward surface of the indexing disc, the sloped surface complementary to the sloped surface of the indexing ramp.

3. The indexing assembly of claim 2 further comprising first and second opposing knife guides, each knife guide connectable to a distinct side of the base board and having an elongated slot which is generally perpendicular to the first longitudinal axis, both elongated slots lying in a plane wherein the axial distance along the first disc and the plane varies in direct relation to the preselected notch in which the indexing pin is seated.

4. An indexing assembly for positioning an object on a base board and for facilitating the cutting of the object into slices, comprising:

an indexing disc having a rearward surface, the indexing disc operatively connected to the base board, and rotatable about and movable along a longitudinal axis;

means for positioning the indexing disc along the longitudinal axis in response to rotation of the indexing disc about the axis, and for simultaneously positioning the object to be sliced on the base board in order to select a thickness for each slice; and means for engaging the indexing disc to selectively prevent rotation of the indexing disc and to simultaneously selectively prevent movement of the indexing disc along the longitudinal axis so as to selectively fix the position of the indexing disc along the longitudinal axis.

5. The indexing assembly of claim 1 further comprising a handle extending from the base board, the handle having an aperture extending therethrough.

6. A device to facilitate the cutting of an object into slices, comprising:

a board extending along a longitudinal axis, the board having a pair of sides interconnected by a support surface;

a pair of opposing knife guides, each knife guide extending from a distinct side of the board and having an elongated slot located in a plane generally perpendicular to the support surface of the board;

a wall member interconnecting the pair of knife guides, the wall member being spaced a predetermined axial distance from the plane along the longitudinal axis;

an indexing disc supported by the wall member and rotatable about and movable along a second longitudinal axis parallel to and spaced from the first mentioned longitudinal axis, the indexing disc having a rearward surface orientated toward the wall member and a forward surface for engaging the object to be sliced;

an indexing ramp secured to the wall member, the indexing ramp having a sloped surface which extends away from the wall member and toward the rearward surface of the indexing disc, the sloped surface including a plurality of indexing notches therein;

means for biasing the indexing disc toward the wall member; and an indexing pin extending from the rearward surface of the indexing disc toward the support, the indexing pin engageable with a distinct, selectable notch on the sloped surface of the indexing ramp so as to prevent rotation of the indexing disc about the second longitudinal axis and so as to select the axial distance between the forward surface of the indexing disc and the plane thereby selecting the thickness of the slices.

7. The device of claim 6 wherein the support surface includes a groove extending between the sides of the board, the groove lying in the plane.

8. The device of claim 6 wherein the means for biasing the indexing disc includes a spring.

9. The device of claim 6 further comprising a rotatable knob interconnected to the indexing disc by a connection member, the connection member extending through the wall member and translating rotation of the knob to the indexing disc.

10. A device to facilitate the cutting of an object into slices, comprising:

a board extending along a first longitudinal axis;

an indexing assembly pivotably mounted to the board for positioning the object on the board in order to select a thickness for each slice of the object, the indexing assembly movable between a first open condition and a second closed condition and including an indexing disc rotatable about and movable along a second longitudinal axis spaced and parallel to the first longitudinal axis, the indexing disc having a forward surface for engaging the object and a rearward surface; and means for selectively preventing rotation of the indexing disc while simultaneously selectively preventing axial movement of the indexing disc along the second longitudinal axis, and for thereby controlling the position of the indexing disc along the second longitudinal axis.

11. The device of the claim 10 wherein the board includes a pair of sides interconnected by a cutting surface.

12. The device of claim 11 further comprising a pair of opposing knife guides, each knife guide extending from a distinct side of the board and having an elongated slot lying in a plane perpendicular to the first longitudinal axis.

13. The device of claim 12 wherein the cutting surface includes a groove perpendicular to and lying in the plane with each elongated slot of the knife guides.

14. The device of claim 12 wherein the axial distance along the second longitudinal axis between the forward surface of the indexing disc and the plane corresponds to the preselected notch in which the indexing pin is seated.

15. The device of claim 10 further comprising a handle extending from the board, the handle having an aperture extending therethrough.

16. The device of claim 10 further comprising a support extending from the board in a direction perpendicular to the first and second longitudinal axis.

17. The device of claim 16 wherein the means for preventing rotation of the indexing disc while simultaneously preventing axial movement of the indexing disc along a second longitudinal axis comprises:

an indexing ramp secured to the support, the indexing ramp having a sloped surface which extends away from the support and toward the rearward surface of the indexing disc, the sloped surface including a plurality of indexing notches therein;

means for biasing the indexing disc relative to the support; and an indexing member extending from the rearward surface of the indexing disc toward the support, the indexing member including an indexing pin which may be seated within a distinct, preselected notch in the sloped surface of the indexing ramp.

18. The device of claim 17 wherein the indexing member includes a sloped surface which extends away from the rearward surface of the indexing disc, the sloped surface complementary to the sloped surface of the indexing ramp.

19. The device of claim 10 further comprising one or more tab members extending from one of the pair of opposing knife guides towards the other of the pair of opposing knife guides.

* * * * *

UNITED STATES PATENT AND TRADEMARK OFFICE
CERTIFICATE OF CORRECTION

PATENT NO. : 5,577,430

DATED : November 26, 1996

INVENTOR(S) : GLENN K. GUNDERSON ET AL

It is certified that error appears in the above-identified patent and that said Letters Patent is hereby corrected as shown below:

On the title page:

item [56] References Cited, add: -- U.S. Patent 5,361,666, 11/1994, Kensrue --.

Claim 5, column 5, line 36, delete "1" and substitute therefor -- 4 --.

Signed and Sealed this

Eleventh Day of March, 1997

Attest:

BRUCE LEHMAN

*Attesting Officer*    *Commissioner of Patents and Trademarks*